(No Model.)

W. WEBBER.
BICYCLE TRAINING DEVICE.

No. 553,373. Patented Jan. 21, 1896.

WITNESSES:
R. Guthman
Milton M. Goldsmith

INVENTOR
Wesley Webber
BY H. A. West
ATTORNEY

UNITED STATES PATENT OFFICE.

WESLEY WEBBER, OF PITTSBURG, PENNSYLVANIA.

BICYCLE TRAINING DEVICE.

SPECIFICATION forming part of Letters Patent No. 553,373, dated January 21, 1896.

Application filed August 17, 1895. Serial No. 559,617. (No model.)

*To all whom it may concern:*

Be it known that I, WESLEY WEBBER, a citizen of the United States, and a resident of Pittsburg, in the county of Allegheny and State of Pennsylvania, have invented certain new and useful Improvements in Bicycle-Supports, of which the following is a specification.

Reference is to be had to the accompanying drawings, forming a part of this specification, and in which like letters of reference indicate corresponding parts in all the figures.

Figure 1:
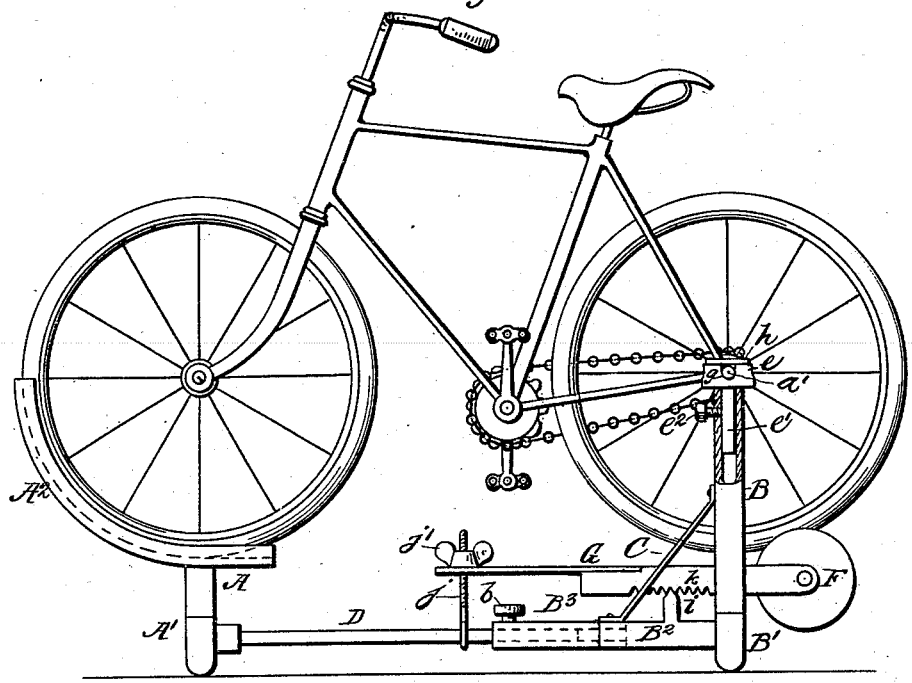
Figure 2:
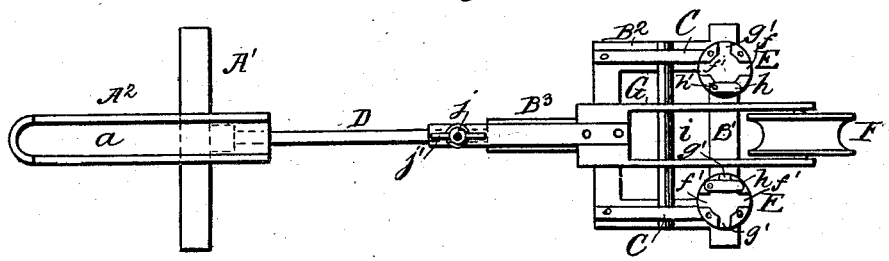
Figure 3:
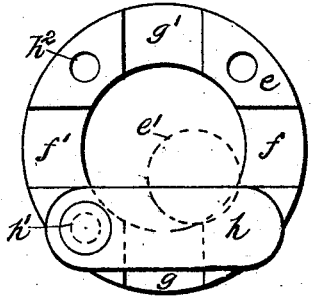

Figure 1 is a side elevation of my new bicycle support and training apparatus and bicycle thereon with one of the standards partly in section. Fig. 2 is a plan view of the support, and Fig. 3 is an enlarged plan view of one of the axle clamps or holders removed from its standard.

My invention will first be described in connection with the drawings and then pointed out in the claims.

A represents the front, and B B the rear uprights or standards, of my new bicycle-support. The front standard rises from the center of a foot or base piece A', and is formed or provided with a shoe or rest A² for the front wheel of the bicycle. This shoe or rest is curved to conform to the circumference of the bicycle-wheel, and is transversely concaved, as shown at $a$, Fig. 2, to receive the tire so as to obviate all danger of lateral displacement of the front wheel of the bicycle, and also to furnish an extended curved bearing for the tire with side flanges to confine it at its sides, so that it will not be injuriously depressed at any point, or spread by the weight of the bicycle and rider.

The rear standards B B rise from a foot or base piece B', which is formed or provided with a front plate or frame B², to which the said standards are braced by struts or bracing-plates C C. The said front plate or frame B² is connected to the said base-piece or foot A' by a rod D, which telescopes an arm B³, to or in which the said rod D is adjustably held by a set-screw $b$, so that the two main parts of the apparatus may be conveniently adjusted to and from each other to adapt the apparatus to support bicycles of different sizes.

The standards B B are tubular in form and each standard is provided at its upper end with a clamp or holder E for securely holding the ends of the rear axle $a'$ of the bicycle.

The clamps or holders E are duplicates and are each formed with a head $e$ and shank $e'$, which latter is adapted to be adjustably held in the upper end of the tubular standard B. It is prevented from turning in the said standard by a set-screw $e^2$. The said head $e$ is eccentric to the shank $e'$, as shown in full and dotted lines in Fig. 3, so that by turning the holder in the standard the margin of the head may be set nearer to or farther away from the adjacent side of rear wheel of the bicycle, as circumstances require, to adapt the apparatus to different makes of bicycles. The upper surface of the head $l$ is recessed, as shown at $f f'$ and $g g'$, to form sockets to receive the ends of the axle. These sockets are at varying distances from the center of the shank $e'$, as shown clearly in Fig. 3, so that by turning the holder they furnish four adjustments—that is, the socket $g'$ being farthest away from the center of the shank $e'$, as shown, is adapted to receive the shortest axle; $f$ being nearest the center of the shank will take the longest axle. Axles of intermediate lengths will be held by socket $f$ or $f'$. In case the said sockets $f f'$ $g g'$ be made shallow, as shown in the drawings, it may be necessary to provide a plate or button $h$ for the sockets to be fitted over the axle to keep it securely in place. This plate or button, as here shown, is held by a bolt $h'$ which passes through one end thereof and enters a hole or screw-tap $h^2$ formed in the head $e$.

F represents a brake or friction wheel arranged to be pressed against the rear wheel of the bicycle. Said wheel F is by preference made concaved at its periphery to fit the bicycle-tire, and is arranged to be adjusted to and from the bicycle-wheel, so that the pressure may be increased or diminished to regulate the amount of exertion required to turn the bicycle. For this purpose it is journaled in a forked lever G, which is fulcrumed on a cross-piece or bridge $i$ formed, by preference, as a part of the frame B². The front end of said forked lever is connected to the rod D, or other permanent part of the apparatus, by a threaded eyebolt or hook $j$ and adjusting-nut $j'$, so that by simply turning this nut the resistance exerted by the wheel F on the rear wheel of the bicycle may be increased or diminished as the rider requires. The lower edge of the said forked lever G is notched, as shown at $k$, to permit it to be adjusted longitudinally on the bridge-piece $i$ for properly locating the brake-wheel F relatively to the rear bicycle-wheel.

Having thus described my invention, what I claim as new, and desire to secure by Letters Patent, is—

1. In a bicycle support, two standards, a base-piece or foot supporting the same, and a front plate or frame formed with, or attached to, said base piece or foot, combined with a front standard and base piece, a support for the front wheel of the bicycle, and an adjustable rod connecting the front base-piece with the said plate or frame, substantially as described.

2. In a bicycle support, a rear base piece, and a front plate or frame $B^3$ formed with a bridge $i$, in combination with standards B for supporting the rear wheel of the bicycle, a lever G fulcrumed on said bridge piece and a brake wheel F journaled in said lever substantially as described.

3. In a bicycle support the standards B B, in combination with the axle clamps E E, each formed with a shank fitted to rotate in said standards, and with a head $e$ formed with recesses or sockets to receive the ends of the bicycle axle substantially as described.

4. The standard B, in combination with the clamp E, formed with a shank $e'$, and recessed head $e$, eccentrically secured to said shank, substantially as described.

WESLEY WEBBER.

Witnesses:
H. A. WEST,
EMILE RIESER.